(12) United States Patent
Vaucher et al.

(10) Patent No.: US 12,287,423 B2
(45) Date of Patent: Apr. 29, 2025

(54) MIMO RADAR SYSTEM

(71) Applicant: NXP B.V., Eindhoven (NL)

(72) Inventors: Cicero Silveira Vaucher, Eindhoven (NL); Nick Andrew Cancrinus, Delft (NL); Olexander Yarovyi, Delft (NL); Jan Puskely, Delft (NL)

(73) Assignee: NXP B.V., Eindhoven (NL)

( * ) Notice: Subject to any disclaimer, the term of this patent is extended or adjusted under 35 U.S.C. 154(b) by 338 days.

(21) Appl. No.: 17/633,271

(22) PCT Filed: Jul. 24, 2020

(86) PCT No.: PCT/EP2020/070999
§ 371 (c)(1),
(2) Date: Feb. 7, 2022

(87) PCT Pub. No.: WO2021/037454
PCT Pub. Date: Mar. 4, 2021

(65) Prior Publication Data
US 2022/0342033 A1    Oct. 27, 2022

(30) Foreign Application Priority Data
Aug. 26, 2019  (NL) ..................................... 2023707

(51) Int. Cl.
*G01S 7/03*  (2006.01)
*H01Q 21/06*  (2006.01)
(52) U.S. Cl.
CPC ............... *G01S 7/03* (2013.01); *H01Q 21/06* (2013.01)
(58) Field of Classification Search
CPC .................................. G01S 7/03; H01Q 21/06
See application file for complete search history.

(56) References Cited

U.S. PATENT DOCUMENTS 3,255,450 A     6/1966   Butler
5,598,163 A  *  1/1997   Cornic ................... G01S 13/426
                                                    342/107

(Continued)

FOREIGN PATENT DOCUMENTS

CN      1173435 C  * 10/2004  ............. H01Q 21/08
EP      834955 A2  *  4/1998  ......... H01Q 21/0006

(Continued)

OTHER PUBLICATIONS

Bona, M., "Low-Loss Compact Butler Matrix for a Microstrip Antenna", IEEE Transactions on Microwave Theory and Techniques, vol. 50, No. 9, Sep. 2002.

(Continued)

*Primary Examiner* — Vladimir Magloire
*Assistant Examiner* — Maxine McKenzie Phillips

(57) ABSTRACT

The present disclosure relates to a MIMO radar system, comprising a first beamforming network (6) comprising a first beam ports (7A) and antenna ports (7B), wherein the first beamforming network is configured to connect the first beam ports via the first antenna ports to the first antenna elements, wherein the first beamforming network is configured to generate for each first beam port a single beam pattern. The first antenna elements transmitting or receiving a single beam pattern selected from the number of single beam patterns, wherein the first antenna elements are spaced apart at a first distance selected to provide a beam pattern of the first antenna array essentially consisting of a plurality of single main lobes. The radar system also has a similar second beamforming network (8). The second antenna elements of which are spaced apart at a second distance, larger than the first distance, the second distance being selected to provide a beam pattern of the second antenna array essen- (Continued)

tially consisting of multiple main lobes and multiple side lobes.

23 Claims, 6 Drawing Sheets

(56) References Cited

U.S. PATENT DOCUMENTS

| | | | |
|---|---|---|---|
| 6,198,434 B1 | 3/2001 | Martek et al. | |
| 6,380,910 B1* | 4/2002 | Moustakas | H01Q 21/06 |
| | | | 343/893 |
| 6,970,142 B1 | 11/2005 | Pleva et al. | |
| 8,604,989 B1* | 12/2013 | Olsen | H01Q 3/40 |
| | | | 343/754 |
| 10,187,134 B1 | 1/2019 | Bailer et al. | |
| 10,218,086 B2 | 2/2019 | Minami et al. | |
| 11,573,310 B2* | 2/2023 | Arkind | H04B 7/0413 |
| 2005/0101352 A1 | 5/2005 | Logothetis et al. | |
| 2007/0001897 A1* | 1/2007 | Alland | G01S 7/352 |
| | | | 342/158 |
| 2009/0322608 A1* | 12/2009 | Adams | H01Q 3/00 |
| | | | 342/368 |
| 2010/0066634 A1 | 3/2010 | Derneryd et al. | |
| 2013/0088393 A1 | 4/2013 | Lee et al. | |
| 2014/0219124 A1 | 8/2014 | Chang et al. | |
| 2015/0092621 A1 | 4/2015 | Jalloul et al. | |
| 2016/0077195 A1 | 3/2016 | Chang | |
| 2016/0365631 A1* | 12/2016 | Huang | H01Q 21/08 |
| 2018/0049141 A1* | 2/2018 | Choi | H04W 56/0015 |
| 2018/0156891 A1 | 6/2018 | Brune et al. | |
| 2018/0372837 A1 | 12/2018 | Bily et al. | |
| 2020/0322072 A1* | 10/2020 | Takano | H04B 7/088 |

FOREIGN PATENT DOCUMENTS

| | | |
|---|---|---|
| JP | H08105962 A | 4/1996 |
| KR | 20180060341 A | 6/2018 |
| WO | 2004082070 A1 | 9/2004 |
| WO | WO-2015165471 A1 * | 11/2015 ......... G02B 27/0927 |
| WO | 2021037454 A1 | 3/2021 |

OTHER PUBLICATIONS

Brookner, E., "MIMO Radars and Their Conventional Equivalents", 2015 IEEE Radar Conference (RadarCon), May 10-15, 2015.

Fishler, E., "MIMO Radar: An Idea Whose Time Has Come", Proceedings of the 2004 IEEE Radar Conference, Apr. 29, 2004.

Gruszczynski, S., "Reduced Sidelobe Four-Beam N-Element Antenna Arrays Fed by 4 N Butler Matrices", IEEE Antennas and Wireless Propagation Letters, vol. 5, Oct. 23, 2006.

Hansen, R.C., "Design trades for Rotman lenses", IEEE Transactions on Antennas and Propagation, vol. 39, No. 4, Apr. 1991.

Ku, B., "A 77-81-GHz 16-Element Phased-Array Receiver With ±50? Beam Scanning for Advanced Automotive Radars", IEEE Transactions on Microwave Theory and Techniques, vol. 62, No. 11, Nov. 2014.

Meitzner, J., "MIMO Arrays Versus Conventional Thin Arrays for 2D and 3D Radar Applications", Proceedings of the 14th European Radar Conference, Oct. 11-13, 2017.

Menzel, W., "Antenna Concepts for Millimeter-Wave Automotive Radar Sensors", Proceedings of the IEEE, vol. 100, Issue 7, Jul. 2012.

Nedil, M., "Novel butler matrix using CPW multilayer technology", IEEE Transactions on Microwave Theory and Techniques, vol. 54, No. 1, Jan. 2006.

Papadogiannis, A., "Multi-beam assisted MIMO—a novel approach to fixed beamforming", Future Network and Mobile Summit 2011 Conference Proceedings, Jun. 15-17, 2017.

Tekkouk, K., "Multibeam SIW Slotted Waveguide Antenna System Fed by a Compact Dual-Layer Rotman Lens", IEEE Transactions on Antennas and Propagation, vol. 64, No. 2, Feb. 2016.

Wang, S., "MIMO-RSFT Radar: A Reduced Complexity MIMO Radar Based on the Sparse Fourier Transform", 2017 IEEE Radar Conference (RadarCon), May 8-12, 2017.

International Search Report dated Sep. 9, 2020 in PCT Application No. PCT/EP2020/070999.

* cited by examiner

MIMO RADAR SYSTEM

CROSS-REFERENCE TO RELATED APPLICATIONS

This application claims priority to WO Application No. PCT/EP2020/070999, filed on 24 Jul. 2020, entitled "MIMO RADAR SYSTEM", and which claims priority under 35 U.S.C. § 119 of NL Application No. N2023707, filed on 26 Aug. 2019 entitled "MIMO RADAR SYSTEM"; and also claims priority to WO Application No. PCT/EP2020/070999, filed on 24 Jul. 2020, entitled "MIMO RADAR SYSTEM", the contents of which are incorporated by reference herein.

The present disclosure relates to MIMO radar system and to the use of such system.

MIMO radars systems are widely used in various applications: automotive applications, intelligent lightning, human being monitoring, etc.—for instance in applications wherein full phased arrays are too costly to implement. In the example of automotive applications, self-driving vehicles have become increasingly more important in recent years. Self-driving vehicles make it possible to improve road safety and traffic flow. They also remove the requirement for a human driver to be actively controlling the vehicle. A sensor that is used in self-driving vehicles is automotive radar. In this case antennas are placed on the exterior of the vehicle. One antenna is used to transmit an electromagnetic pulse into the space around the vehicle. This pulse will reflect from objects in the vicinity of the vehicle. Another antenna, or the same antenna, is used to receive the reflections. The time it takes for reflections to return and the frequency shift of the reflections can be used to obtain information on the range and speed of the reflecting objects.

Such MIMO radar systems are known from the prior art and an example is shown in FIG. 1. Such systems are designed by attuning two antenna arrays (Transmitter/Receiver). Such radar systems are typically designed to function at a certain frequency 'f'. The '$N_{TX}$' antenna elements ('Y'-symbols) which make up the transmission array are spaced at an inter-element distance '$d_{tx}$,' of up to half the wavelength of the operational frequency, while the '$N_{RX}$' antenna elements which make up the reception array are spaced at an inter-element distance '$d_{RX}$' of '$N_{TX} \times d_{TX}$'. Or vice versa: role of transmission array and reception array can be exchanged.

Moreover, MIMO radar systems are commonly implemented by using a digital chip which comprises a certain number of transmission and reception channels. In FIG. 1, the digital chip comprises transmission channels '1, 2, ... $N_{TX}$' and reception channels '1, 2, ... $N_{RX}$'. The channels for example comprise amplifiers, filters and digital-to-analog or analog-to-digital converters. Each of these channels is connected to their respective antenna element.

The abovementioned design constrains ensure a number of things. Firstly, the spacing of the transmission array ensures that a main lobe 1 will be dominant in the transmission beam pattern. Secondly, while there will be grating lobes 3 present in the reception beam pattern, if main lobe 2 of the reception beam pattern is steered to overlap with main lobe 1 of the transmission beam pattern, these grating lobes 3 will be arranged at the same angle as where the transmission beam pattern goes to zero for the first time. The distance between these two points is also called the Null-Null bandwidth of the main lobe. This can for example be seen in FIG. 2A.

That is, said constraints ensure that grating lobes 3 present in the reception beam pattern are suppressed. This method provides unambiguous angular information since the beam pattern which of is the result of combining the transmission and reception beam patterns consists of a main lobe 4 and a plurality of side lobes 5, as can be seen in FIG. 2B.

For example, in such a system the transmission side may consist of 3 transmission channels, connected to elements spaced at 0.5λ and the reception side may consist of 4 reception channels, connected to elements spaced at 1.5λ. For such a system, the effective aperture is 5.5λ and the −3 dB beam width is approximately 8.4 up to 9.5 degrees, depending on the desired side lobe level. Such a system theoretically gives a full scan range of ±90 degrees, although in practice this can be less.

For many applications, the angular accuracy which can be achieved by such a system is insufficient. This angular accuracy is limited by the wide beam width achieved by the antenna arrays. It is known to the skilled person that a narrower beam width can be achieved in an array with a larger effective aperture. This can be achieved in two ways: First additional elements can be added to the outer sides of the array and/or secondly, the inter-element distance can be increased.

Most MIMO radar systems are however designed using off the shelf digital chips which, at present, have a small number of channels and moreover, popular designs already use all available channels. Moreover, it is far from trivial to develop digital chips having larger and larger numbers of channels. Extending the transmission or reception array in the known MIMO radar systems therefore does not provide a sufficient solution.

Because the transmission beam pattern should not have grating lobes and because the side lobes of the reception beam pattern have to be suppressed, the inter-element distance can also not be increased much further. Increasing the inter-element distance of the transmission and reception array is therefore not feasible.

The present disclosure sets out to provide a MIMO radar system in which the mentioned shortcomings are reduced or not present at all. Moreover the present disclosure sets out to provide a MIMO radar system which achieves a narrower beam width and a higher angular accuracy for target localization.

According to a first aspect of the present disclosure a MIMO radar system is provided, comprising:
  a first beamforming network comprising a first number of first beam ports and a second number of antenna ports connected to respective first antenna elements, wherein the first beamforming network is configured to connect the first beam ports via the first antenna ports to the first antenna elements, wherein the first beamforming network is configured to generate for each of the first beam ports a different first beam pattern;
  a first antenna array comprising the first antenna elements configured to transmit or receive first beam patterns of the first beam ports, wherein the first antenna elements are spaced apart at a first distance selected to provide for each first beam port a different first beam pattern essentially consisting of a single main lobe; and
  a second beamforming network comprising a third number of second beam ports and a fourth number of second antenna ports connected to respective second antenna elements, wherein the second beamforming network is configured to connect the second antenna elements via the second antenna ports to the second beam ports, wherein the second beamforming network is configured to generate for each of the second beam ports a different second beam pattern;

a second antenna array comprising the second antenna elements configured to receive or transmit second beam patterns of the second beam ports, wherein the second antenna elements are spaced apart at a second distance, larger than the first distance, the second distance being selected to provide for each second beam port a different second beam pattern essentially consisting of multiple lobes;

wherein in operation first beam patterns of the first antenna array are combined with second beam patterns of the second antenna array to provide a combined beam pattern.

In this manner the beam patterns (for instance TX beams) of the first antenna array can correctly distinguish between different main lobes of the multiple main lobes of the second antenna array.

In embodiments of the present disclosure for each of the lobes of a second beam pattern of the second antenna array, each single main lobe of the different first beam patterns of the first antenna array essentially does not overlap with more than one lobe of the second beam pattern of the second antenna array.

In further embodiments of the present disclosure a MIMO radar system is provided wherein in the combined beam pattern, for each second beam port, each lobe of the multiple lobes of the second beam pattern is overlapped by the single main lobe of a different first beam pattern of the first antenna array. In the combined beam pattern, for each second beam port, each lobe of the multiple lobes of the second beam pattern is preferably overlapped by the single main lobe of a different first beam pattern of the first antenna array while the non-overlapped lobes of the multiple lobes are suppressed.

According to an embodiment of the present disclosure the second number ($N_{TX}$) of antenna elements is larger than the first number ($N_{bTX}$) of beam ports and/or the fourth number ($N_{RX}$) of second antenna ports is larger than the third number ($N_{bRX}$) of second beam ports.

According to an embodiment of the present disclosure the first antenna elements are spaced apart at a distance smaller than c/(2f) and/or the second antenna elements are spaces apart at a distance smaller than c/f, wherein f is the operating frequency of the radar system and c is the speed of light.

According to an embodiment of the present disclosure the system is configured to cause selection of a cross-channel by selecting a first beam port of the first beamforming network (TX) and a second beam port of the second beamforming network (RX,TX), preferably configured to select a total number (c) of orthogonal cross channels equal to first number multiplied by the second number.

According to an a embodiment of the present disclosure the first antenna array functions as a transmission antenna array and the second antenna array functions as a reception antenna array. In operation, the first antenna elements transmit radar signals, the radar signals may be reflected and the radar signals are received by the second antenna elements.

According to a different embodiment of the present disclosure the first antenna array functions as a reception antenna array and the second antenna array functions as a transmission antenna array. In operation, the second antenna elements transmit radar signals, the radar signals may be reflected and the radar signals are received by the second antenna elements.

According to further embodiments of the present disclosure at least one of the first and second beamforming network is implemented by a Butler matrix network or Rotman lens.

According to still further embodiments of the present disclosure the plurality of single main lobes of the first antenna array are arranged contiguously.

According to embodiments of the present disclosure an angular area covered by the single main lobe of the first antenna array is less than an angular distance between the main lobes of the second antenna array, preferably defined by the −3 dB-bandwidth or the Null-Null bandwidth.

According to another aspect the present disclosure also relates to a method of operating a MIMO radar system, comprising:

connecting by the first beamforming network the first beam ports via the first antenna ports to the first antenna elements and generating by the first beamforming network for each of the first beam ports a different first beam pattern;

transmitting or receiving by first antenna elements of a first antenna array first beam patterns of the first beam ports, the first antenna elements being spaced apart at a first distance selected to provide for each first beam port a different first beam pattern essentially consisting of a plurality of single main lobes;

connecting by the second beamforming network the second antenna elements via the second antenna ports to the second beams ports and generating by the first beamforming network for each of the second beam ports a different second beam pattern;

receiving or transmitting by second antenna elements of a second antenna array second beam patterns of the second beam ports, the second antenna elements being spaced apart at a second distance, larger than the first distance, selected to provide for each second beam port a different second beam pattern essentially consisting of a multiple lobes;

wherein the first beam patterns of the first antenna array are combined with second beam patterns of the second antenna array to provide a combined beam pattern.

In embodiments of the present disclosure a method is provided wherein for each of the lobes of a second beam pattern of the second antenna array, each single main lobe of the different beam patterns of the first antenna array essentially does not overlap with more than one lobe of the second beam pattern of the second antenna array.

In further embodiments a method is provided wherein in the combined beam pattern, for each second beam port, each lobe of the multiple lobes of the second beam pattern is overlapped by the single main lobe of a different first beam pattern of the first antenna array (while the non-overlapped lobes of the multiple lobes are preferably suppressed).

Optionally the method comprises selecting a cross-channel by selecting a first beam port of the first beamforming network (TX) and a second beam port of the second beamforming network (RX,TX), preferably comprising selecting a total number (c) of orthogonal cross channels equal to first number multiplied by the second number.

In embodiments of the present disclosure the first antenna elements of the first antenna array transmit beam radar signals and the second antenna elements of the second antenna array receives radar signals. The radar signals comprise (radar) beam patterns transmitted from the first antenna elements and received by the second antenna elements. Similarly, in other embodiments, the second antenna elements of the second antenna array transmit beam radar signals and the first antenna elements of the first antenna array receives radar signals.

A few advantages associated with embodiments of the present disclosure are as follows.

The method of selecting a cross-channel ensures that even with a limited number of transmission and reception channels, a larger number of combined channels can be used than in MIMO radar systems known from the state of the art. Based on a selection scheme according to the present disclosure the field of view of the radar system can be controlled with higher resolution.

Moreover, the MIMO radar system as defined herein provides a trade-off between the FOV and the angular resolution, while maintaining a good coverage within the FOV.

Further advantages, features and details of the present disclosure will be elucidated based on the following description of several embodiments thereof. Reference is made in the description to the accompanying figures, in which:

FIG. 1 shows a MIMO radar configuration known from the prior art.

FIG. 2A-B respectively show the individual and the combined the beam patterns achieved by the MIMO radar configuration of FIG. 1, known from the prior art.

Figure 1:
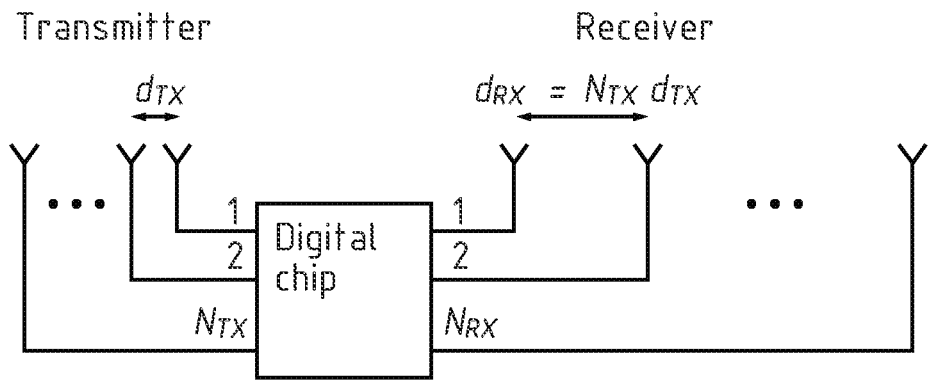

As discussed above, FIG. 1 shows a MIMO radar configuration known from the prior art. The digital chips which are commonly used in MIMO radar system have a limited number of transmission and reception channels.

Furthermore, beamforming networks are known from the state of the art. A beamforming network generally comprises '$N_b$' inputs, also called beam ports or channels, and can be connected to an array of 'N' antenna elements. A signal which is provided at a beam port is transformed by the network into a sequence of signals which, when transmitted from the N antenna elements, generate the desired beam pattern.

Common beamforming networks have an equal number of beam ports and antenna elements, '$N=N_b$', and are designed to generate orthogonal beam patterns when the beam ports are excited. That is, a discrete number of beam ports can be used to 'address' a discrete number of beam patterns. Reciprocity of the network also allows the beamforming network to be used at a reception side of a MIMO radar installation. In this case, signals received by the antenna array are transformed by the network and depending on the signals angle of arrival, the signal can be provided at one of the beam ports.

Figure 3A:
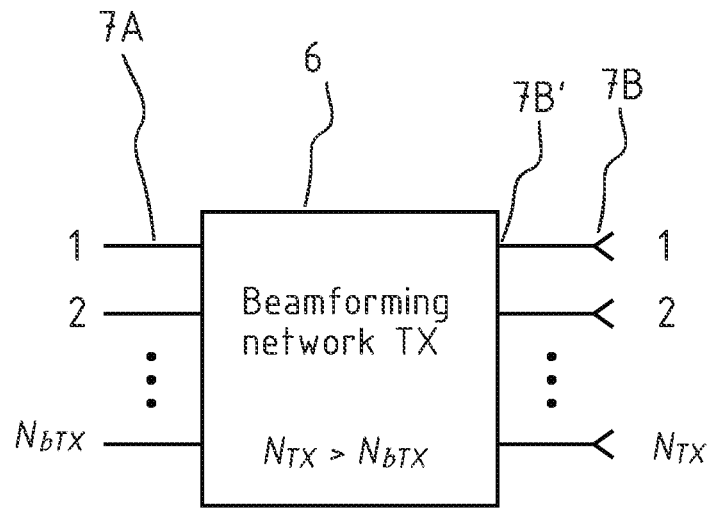
FIG. 3A shows an input-out layout of a beamforming network as used on the transmission side of an embodiment.
Figure 3B:
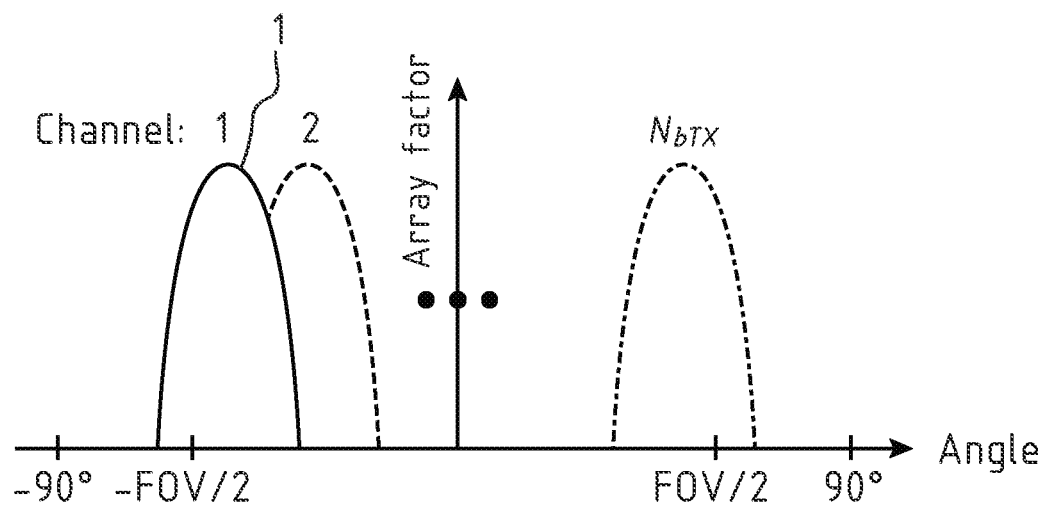
FIG. 3B shows a schematic drawing of some of the transmission side beam patterns generated by the beamforming network of FIG. 3A.

FIG. 3A shows a beamforming network 6 which can be a part of the MIMO radar system according to an embodiment of the invention. FIG. 3B shows a schematic drawing of some of the transmission side beam patterns generated by the beamforming network of FIG. 3A. The X-axis depicts the angle of arrival as seen from the broadside of the array. The Y-axis depicts the strength of a unit signal received from that angle of arrival, also known as the array factor, in decibels.

It is shown in FIG. 3A that in an exemplary embodiment, beamforming network 6 has '$N_{bTX}$' first beam ports 7A. Moreover, beamforming network 6 is connected via '$N_{TX}$' antenna ports 7B' to '$N_{TX}$' antenna elements 7B. In this embodiment, the elements 7B are spaced in such a manner that the beam patterns have no grating lobes. Every beam port 7A generates its respective orthogonal beam pattern. Each of the first beam ports 7A is connected to a transmission channel of a digital chip, similar to the one shown in FIG. 1. Therefore, each beam pattern is also sometimes referred to as a channel. In this embodiment, the antenna geometry is such that only azimuth-scanning is possible, the elevation pattern is fixed.

For each of the respective beam patterns, the main lobe 1 is shown in FIG. 3B. The side lobes 5 which are part of the transmission beam patterns are not shown. Preferably, the main lobes of the respective transmission beam patterns are contiguous which allows them to cover a continuous angular section.

In a preferred embodiment, specifically if a higher angular resolution is required, it holds that $N_{TX} > N_{bTX}$. Using a larger number of elements provides an array with a larger effective aperture and from this array, a beam with a narrower main lobe 1 can be generated. However since the number of first beam ports 7A remains the same, it is not possible to address all the possible beam patterns which a complete beamforming network would provide. Therefore, only '$N_{bTX}$' contiguous main lobes 1, as can be seen in FIG. 3B are used. These will cover less field of view (FOV) than before. The FOV of the MIMO radar system is determined based on the smallest FOV between the transmission and reception array. In the present embodiment, the FOV is defined by the transmission beam patterns as described above.

Figure 4A:
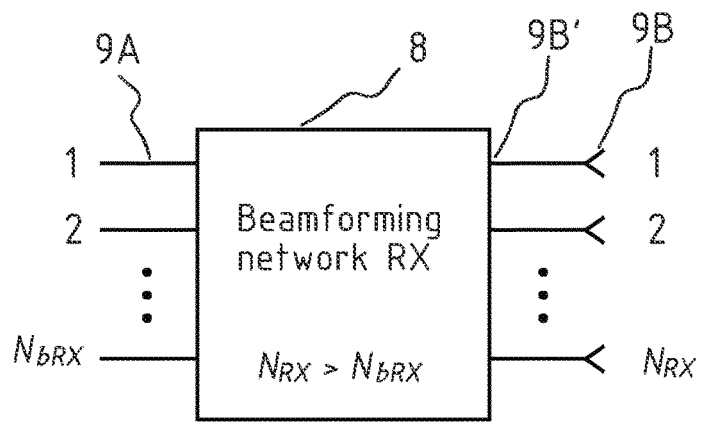
FIG. 4A shows an input-out layout of a beamforming network as used in an embodiment.
Figure 4B:
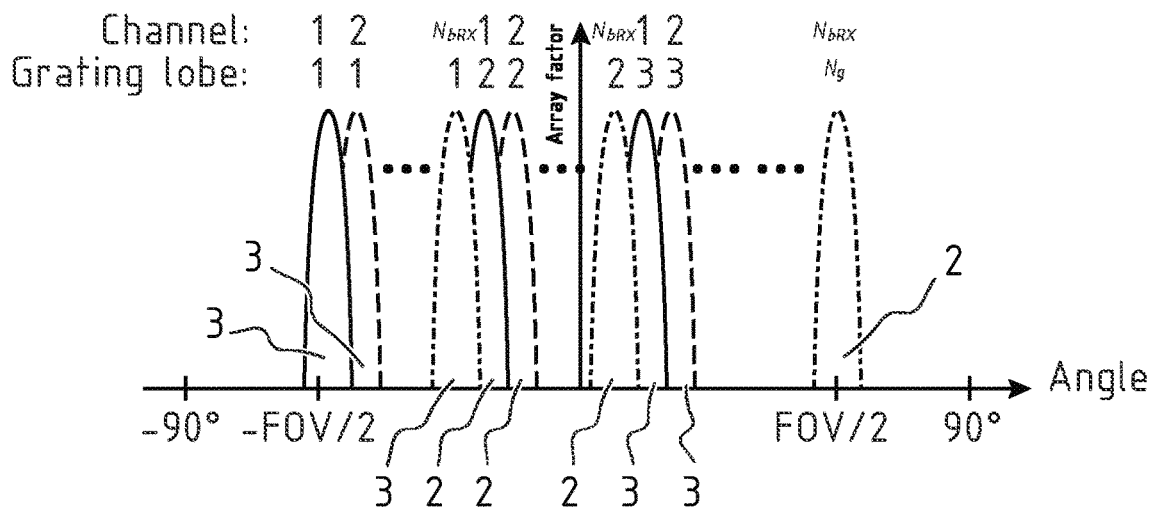
FIG. 4B shows a schematic drawing of some of the reception side beam patterns generated by the beamforming network of FIG. 4A.

FIG. 4A shows a beamforming network which can be a part of the MIMO radar system as used in an embodiment of the invention. FIG. 4B shows a schematic drawing of some of the reception beam patterns generated by a beamforming network 8 of FIG. 4A. The axes in FIG. 4B are similar to those shown in FIG. 3B.

It is shown in FIG. 4A that in an exemplary embodiment, beamforming network 8 has '$N_{bRX}$' second beam ports 9A. Moreover, beamforming network 8 is connected via '$N_{RX}$' antenna ports 9B' to antenna elements 9B. In this embodiment, the reception antenna elements 9B are spaced such that the beam patterns have a plurality of lobes comprising the main lobe 2 and one or more grating lobes 3. Every beam port 9A generates its respective orthogonal beam pattern. Since grating lobes 3 are allowed, the antenna elements 9B can be arranged further apart and each of the lobes 2,3 in a plurality of lobes can be rather thin.

For each of the respective beam patterns, the plurality of lobes is shown in FIG. 4B. Preferably, the pluralities of lobes of the respective beam patterns are interwoven in such a manner that they are contiguous, which allows them to cover a continuous angular section. More preferably, they cover at least the FOV as defined by the transmission beam patterns.

In a preferred embodiment, specifically if a higher angular resolution is required, an antenna array 9B may be used for which $|N_{RX}>N_{bRX}|$ holds. In a similar manner as described for FIG. 3B, the larger amount of elements provide an array with a larger effective aperture and from this array, a beam with a narrower main lobe 2 and grating lobes 3 can be generated. However since the number of beam ports 9A remains the same, it is not possible to use more beam patterns.

The lobes in each of the pluralities of lobes are spaced apart far enough that the different transmit beams can distinguish between them. That is, FIG. 4B shows how the lobes within the FOV can be arranged to ensure that each transmission beam overlaps with at most one lobe from one reception beam pattern.

Figure 5:
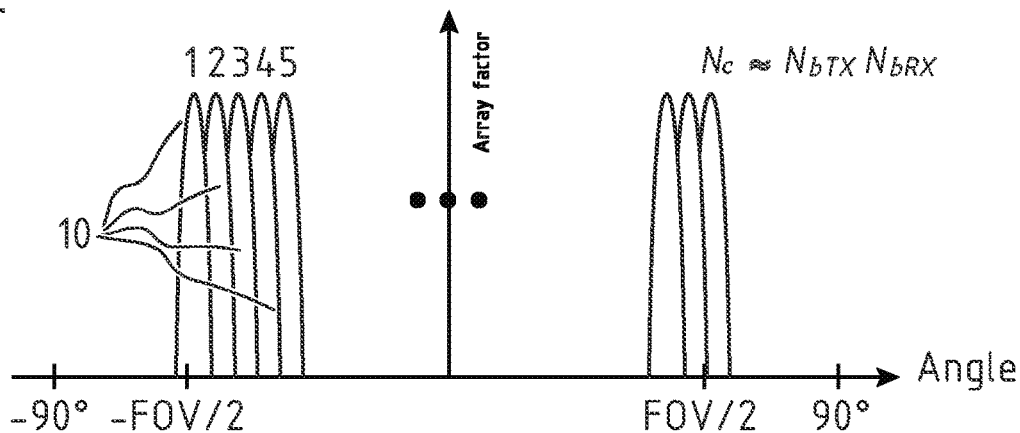
FIG. 5 shows the cross-channels which can be used based on a combination of one transmission side beam pattern and one reception side beam pattern.

FIG. 5 shows the orthogonal cross-channels 10 which can be selected. The axes are similar to those used in FIGS. 3B and 4B.

Figure 2A:
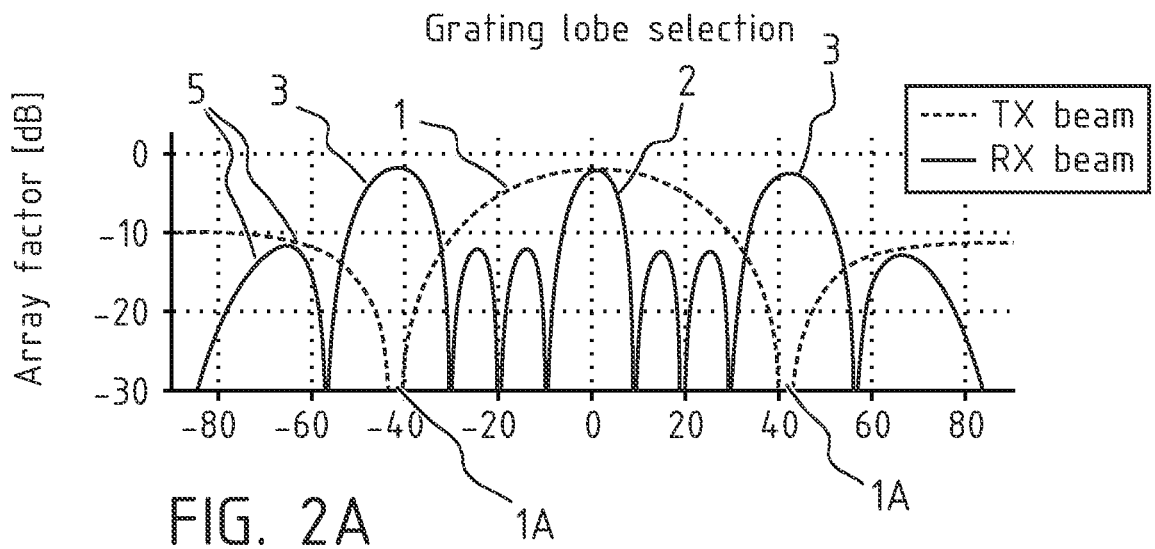
Figure 2B:
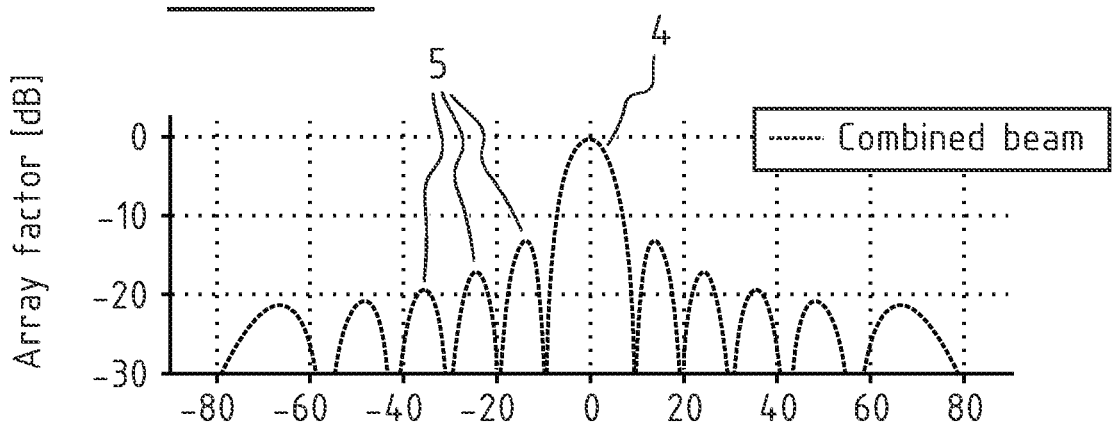

Similar to the combined beam shown in FIG. 2B, each cross-channel 10 is the result of combining one transmission beam pattern and one reception beam pattern. While the complete beam pattern of the cross-channel also comprises side lobes, only the main lobe of each cross-channel is shown.

As mentioned above, each of the discrete number of transmission beam patterns and reception beam patterns provided by the beamforming networks 6, 8 can also be referred to as the channel which it is connected to. Therefore, a cross-channel can also be defined by the transmission channel and reception channel which are addressed. Since both the transmission and reception channels are mutually independent, a unique beam pattern is created for any selection of one transmission and reception channel.

It is preferred that, as explained above, both the transmission beam patterns and the reception beam patterns form a continuous coverage within the FOV. A result thereof is that the total number of cross-channels which can be selected is '$N_C \approx N_{bTX} \times N_{bRX}$'.

Generally, it can be seen that the FOV, primarily determined by the transmission beam patterns, is covered with beams with the beam width of the grating lobes of the reception beam patterns, while each one can be selected individually. To be more precise, the transmit beams do have an influence (however small) on the beam width of the combined beam patterns: if either one of the transmit beam or the receive beam becomes more narrow, the combined beam will generally become smaller as well. The skilled person will appreciate how the abovementioned embodiment provides a trade-off between the FOV and the angular resolution, while maintaining a good coverage within the FOV.

In the further FIGS. 6A-8, an exemplary embodiment will be described. In this embodiment, 3 transmission channels and 4 reception channels will be used. These will be connected to two linear arrays, consisting of 6 and 9 antenna elements respectively. It is however also possible to use a different number of channels and/or antenna elements. In this embodiment, the roles of the transmission array and the reception array are the same as described for FIGS. 3A-4B.

Figure 6A:
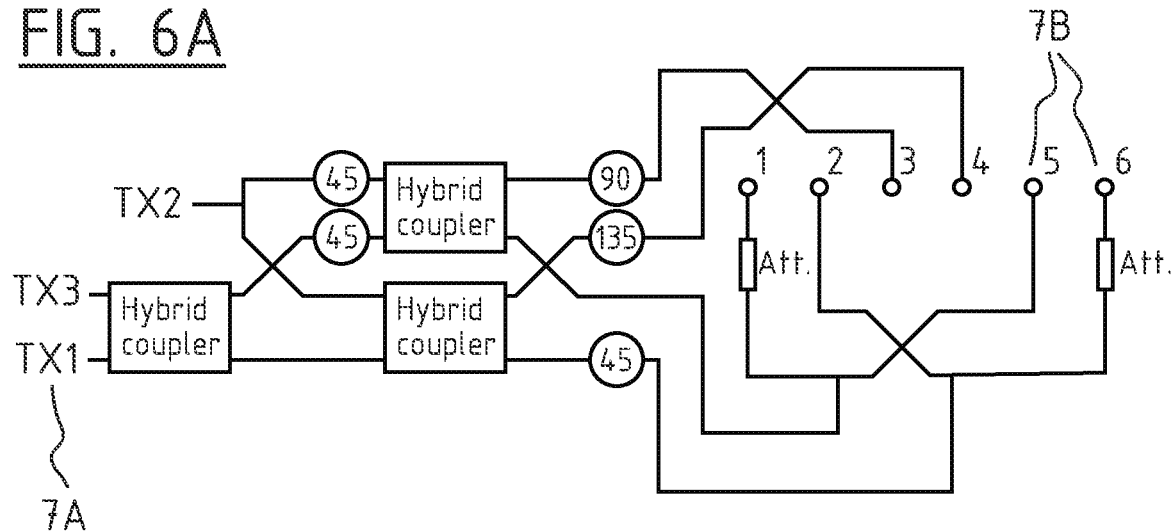
FIG. 6A shows an exemplary embodiment of a transmission side feeding network which generates the desired beam patterns from respective beam ports.
Figure 6B:
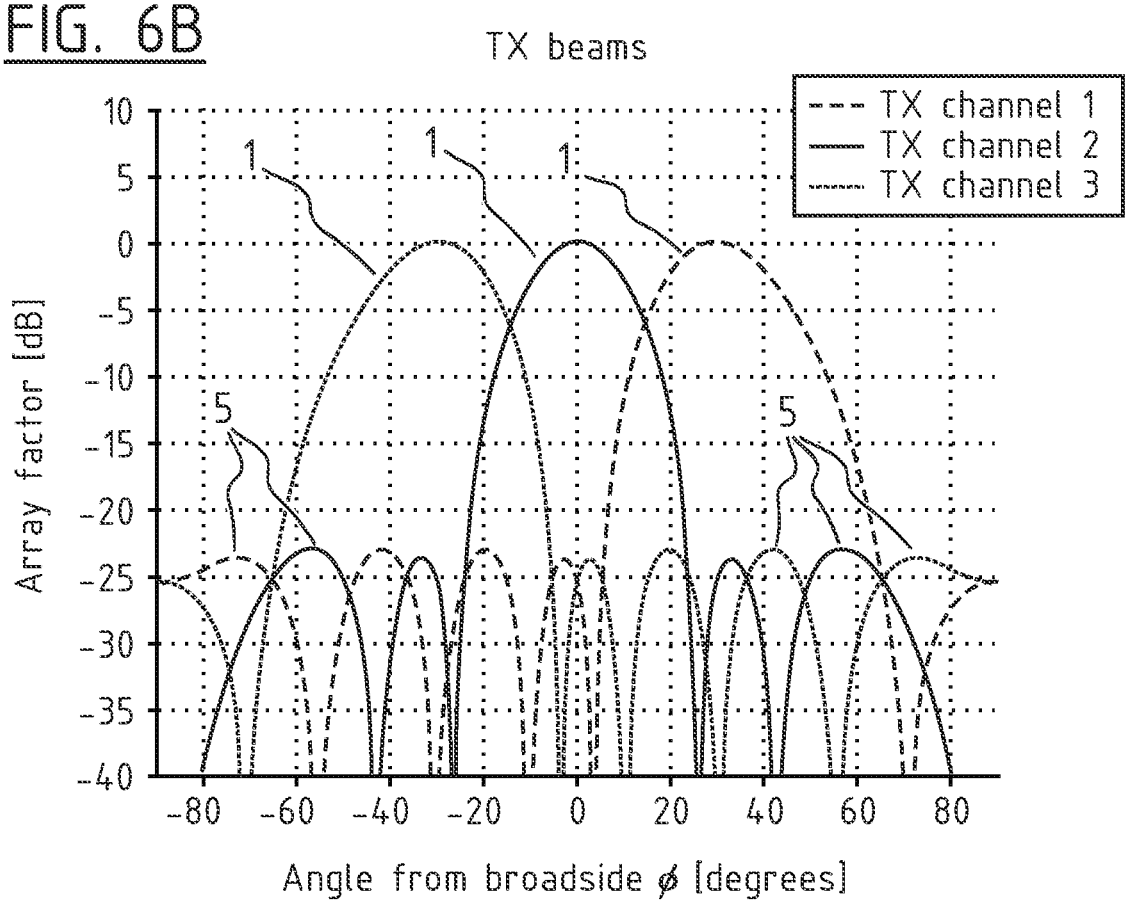
FIG. 6B shows the beam patterns as they can be generated by the network shown in FIG. 6A.

FIG. 6A shows a beamforming network according to the preferred embodiment, in which some version of the Butler matrix is used to feed the transmission array. The spacing of the 6 antenna elements is 0.5λ. When one of the three inputs is excited, the corresponding beam is transmitted. FIG. 6B shows the three beams that correspond to the three transmission beam ports. The transmission beam patterns adjoin approximately at the −6 dB point. The field of view covered by these beams therefore stretches from the outmost left −6 dB point of the third transmission channel, up to the outer most right −6 dB point of the first transmission channel. This results in a FOV of about ±50°.

Each of the transmission channels determines that a different angular sector is investigated by the MIMO radar system. It is important that there is not too much overlap between the transmission beams, because this decreases the capability to distinguish between the lobes in a plurality of lobes. There should also not be too little overlap between transmission beam patterns, because then the coverage of the FOV is no longer continuous.

Furthermore, in FIG. 6A it can be seen that for antenna element 1 and 6, some losses are introduced on purpose. Introducing such losses is known in the state of the art and allows for more freedom in the beam pattern selection. It is also possible to design an array without these losses, but then some properties of the antenna beam patterns will become worse. On the transmit side these losses are 0.7 dB with respect to the total power on the input.

Figure 7A:
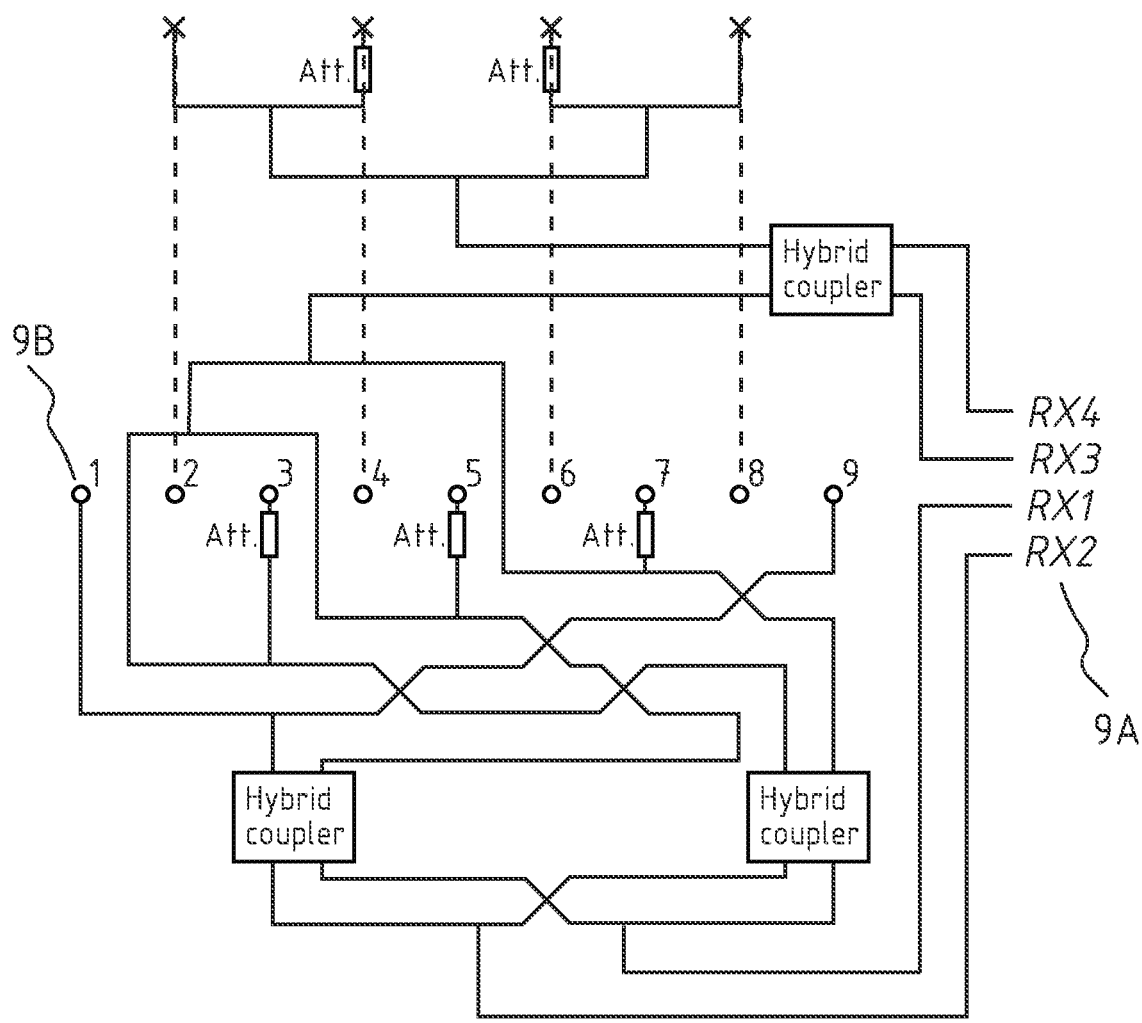
FIG. 7A shows an exemplary embodiment of a reception side feeding network which generated the desired beam patterns from respective beam ports.
Figure 7B:
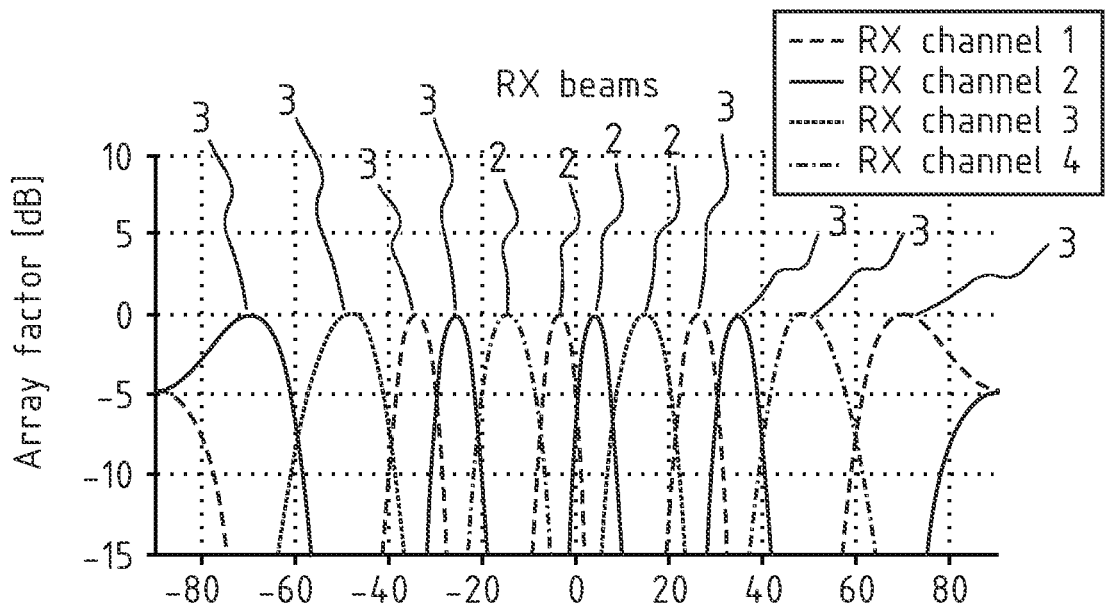
FIG. 7B shows the beam patterns as they can be generated by the network shown in FIG. 7A.

FIG. 7A also shows an exemplary embodiment of a beamforming network, this time to connect to the reception array. FIG. 7B shows beam patterns according to which signals are received on the respective beam ports. For clarity it is stipulated that the reception side beam patterns generated in this embodiment do not all correspond to the beam patterns shown in FIGS. 4B and 5 to exemplify the cross channels.

It can be seen that multiple hybrid couplers, power dividers and crossovers are used to connect the antenna elements to the four channels. The lay-out is based on several Butler matrices. Again some losses are introduced on purpose to have more freedom in beam pattern selection. On the receive side these losses are on average 1.3 dB with respect to the total received power.

There are 4 reception channels available, all of which are connected to the array through the reception beamforming network. The spacing of the array is chosen such that these beam patterns have a plurality of lobes, commonly being a single main lobe 2 flanked by one or more grating lobes 3.

In this embodiment, each plurality of lobes comprises, for each main lobe 1 of a transmission beam pattern, one lobe to overlap therewith. That is, all combinations of the transmission channels and the reception channels provide a unique cross-channel.

The reception beam patterns for reception channels 1 and 2 are generated similar to the beam patterns shown in FIGS. 4B and 5. These beam patterns are chosen such that the plurality of lobes from a single reception beam pattern comprises a lobe for each transmission channel and wherein each lobe overlaps with a single main lobe 1. The grating lobes are preferably arranged near the center of the main lobe of the transmission beam pattern. These reception channels are only connected to the odd antenna elements. These channels have an effective element spacing of 2λ and the corresponding beam patterns therefore have grating lobes that are relatively close together.

Repeating this pattern would result in a third beam pattern of which main lobe 2 is arranged in or to close to the gap between two adjacent transmission beam patterns. If then a signal is received from a certain angle of arrival, it is not sufficiently clear from which transmission channel this is transmitted.

Moreover, a single transmission beam pattern would be flanked by main lobe 2 and grating lobe 3 which correspond to the same reception beam pattern. If then a signal is received in the reception channel corresponding to said reception beam pattern, it is not sufficiently clear what the angle of arrival of this signal is. The MIMO radar system could no longer distinguish between the two lobes.

To overcome this effect, the other two reception channels 3 and 4 are connected to the 7 middle elements, so the two outer elements are excluded. The antenna elements which are used effective element spacing of 1λ and the corresponding beam patterns therefore have grating lobes that are relatively far apart. The number of lobes in the beamforming patterns generated by this beamforming network is at least half the number of transmission beams. The inter lobe distance for these beam patterns ensures that a lobe in a plurality of lobes may overlap with two adjacent main lobes. It is to be understood that for an odd number of transmission beams, the design approach remains the same while there will be one lobe which overlaps with only a single main beam.

In the exemplary embodiment, one lobe of reception channel 3 can be combined with both transmission channels 1 and 2 since it is arranged in between these two channels. An other lobe of reception channel 3 can be combined with transmission channel 3 as this lobe overlaps with transmission channel 3 on the right side of its main lobe 1. Moreover, one lobe of reception channel 4 can be combined with both transmission channels 2 and 3 since it is arranged in between those two channels. An other lobe of reception channel 4 can be combined with transmission channel 1 as this lobe overlaps with transmission channel 1 on the left side of its main lobe 1.

Figure 8:
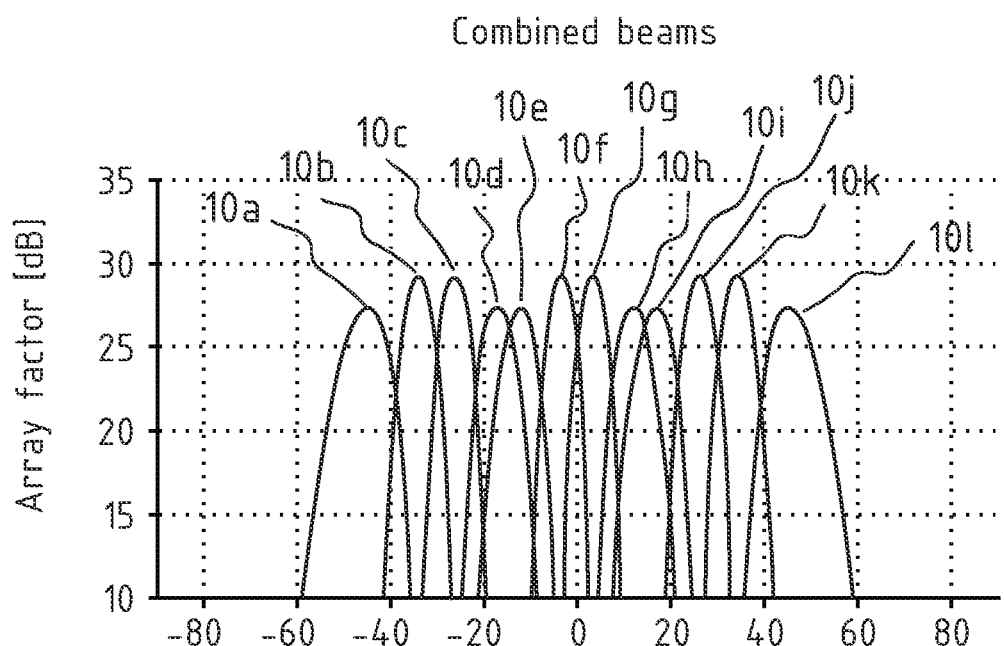
FIG. 8 shows the achieved cross channels when the beam patterns of FIGS. 6B and 7B are combined.

FIG. 8 shows the cross-channels that can be selected when one transmission beam pattern and one reception beam pattern are combined. It can be seen that for this embodiment the combination of the options together provide good coverage from approximately −50 to +50 degrees. The total aperture of the transmission- and reception arrays combined is 10.5λ for the first set of reception beam patterns (reception channels 1 and 2) and 8.5λ for the second set of reception beam patterns (reception channels 3 and 4). The −3 dB-beamwidth of the main lobes of the cross-channels varies from 5.7 degrees to 10.5 degrees.

The angular resolution is finer than would have been the case when the transmission and reception channels are coupled to a number of antenna elements equal thereto. As mentioned, the trade-off is that the complete angular area which is covered is reduced somewhat. This is however not a disadvantage since for many applications a smaller FOV is not a big problem. The maximum side lobe level varies from approximately −17.6 dB to −19.3 dB for the different cross-channels. However, for every cross-channel, only a few side lobes are at this high level, most side lobes are much lower.

The skilled person will realize that the above embodiments are merely exemplary. For example, the array and beamforming network used in the transmission side of the MIMO radar system can be switched with the array and beamforming network used in the reception side. This choice is arbitrary. Moreover, while discussing the angle of arrival in comparison to a broadside of the array implies that the array has a dominant direction or even more in particular, is a linear array, it is to be understood that the array could also be two-dimensional. The antenna array and beamforming network may moreover be implemented by one of many alternative techniques known by the skilled person.

The invention claimed is:

1. A MIMO radar system, comprising:
a first beamforming network comprising a first number of first beam ports and a second number of antenna ports connected to respective first antenna elements, wherein the first beamforming network is configured to connect the first beam ports via the first antenna ports to the first antenna elements, wherein the first beamforming network is configured to generate for each of the first beam ports a different first beam pattern;
a first antenna array comprising the first antenna elements configured to transmit or receive first beam patterns of the first beam ports, wherein the first antenna elements are spaced apart at a first distance selected to provide for each first beam port a different first beam pattern essentially consisting of a single main lobe; and
a second beamforming network comprising a third number of second beam ports and a fourth number of second antenna ports connected to respective second antenna elements, wherein the second beamforming network is configured to connect the second antenna elements via the second antenna ports to the second beam ports, wherein the second beamforming network is configured to generate for each of the second beam ports a different second beam pattern;
a second antenna array comprising the second antenna elements configured to receive or transmit second beam patterns of the second beam ports, wherein the second antenna elements are spaced apart at a second distance, larger than the first distance, the second distance being selected to provide for each second beam port a different second beam pattern essentially consisting of multiple lobes;
wherein in operation first beam patterns of the first antenna array are combined with second beam patterns of the second antenna array to provide a combined beam pattern.

2. MIMO radar system as claimed in claim 1, wherein for each of the lobes of a second beam pattern of the second antenna array, each single main lobe of the different first beam patterns of the first antenna array essentially does not overlap with more than one lobe of the second beam pattern of the second antenna array.

3. MIMO radar system as claimed in claim 1, wherein in the combined beam pattern, for each second beam port, each lobe of the multiple lobes of the second beam pattern is overlapped by the single main lobe of a different first beam pattern of the first antenna array.

4. MIMO radar system as claimed in claim 3, wherein in the combined beam pattern, for each second beam port, each lobe of the multiple lobes of the second beam pattern is overlapped by the single main lobe of a different first beam pattern of the first antenna array while the non-overlapped lobes of the multiple lobes are suppressed.

5. MIMO radar system as claimed in claim 1, wherein the second number of antenna elements is larger than the first number of beam ports and/or wherein the fourth number of second antenna ports is larger than the third number of second beam ports.

6. MIMO radar system as claimed in claim 1, wherein the first antenna elements are spaced apart at a distance smaller than $c/(2f)$ and/or the second antenna elements are spaces apart at a distance smaller than $c/f$, wherein f is the operating frequency of the radar system and c is the speed of light.

7. MIMO radar system as claimed in claim 1, configured to cause selection of a cross-channel by selecting a first beam port of the first beamforming network and a second beam port of the second beamforming network, preferably configured to select a total number (t) of orthogonal cross channels equal to first number multiplied by the second number.

8. MIMO radar system as claimed in claim 1, wherein the first antenna array functions as a transmission antenna array and the second antenna array functions as a reception antenna array.

9. MIMO radar system as claimed in claim 1, wherein the first antenna array functions as a reception antenna array and the second antenna array functions as a transmission antenna array.

10. MIMO radar system as claimed in claim 1, wherein at least one of the first and second beamforming network is implemented by a Butler matrix network or Rotman lens.

11. MIMO radar system as claimed in claim 1, wherein the plurality of single main lobes of the different first beam patterns of the first antenna array are arranged contiguously.

12. MIMO radar system as claimed in claim 1, wherein an angular area covered by the single main lobe of the first antenna array is less than an angular distance between the main lobes of the second antenna array, preferably defined by the −3 dB-bandwidth or the Null-Null bandwidth.

13. MIMO radar system as claimed in claim 1, wherein the first antenna array and/or the second antenna array are uniformly spaced arrays.

14. MIMO radar system as claimed in claim 1, wherein the lobes of the second antenna array are grating lobes.

15. Method of operating a MIMO radar system, the method comprising:
- connecting by the first beamforming network the first beam ports via the first antenna ports to the first antenna elements and generating by the first beamforming network for each of the first beam ports a different first beam pattern;
- transmitting or receiving by first antenna elements of a first antenna array first beam patterns of the first beam ports, the first antenna elements being spaced apart at a first distance selected to provide for each first beam port a different first beam pattern essentially consisting of a plurality of single main lobes;
- connecting by the second beamforming network the second antenna elements via the second antenna ports to the second beams ports and generating by the first beamforming network for each of the second beam ports a different second beam pattern;
- receiving or transmitting by second antenna elements of a second antenna array second beam patterns of the second beam ports, the second antenna elements being spaced apart at a second distance, larger than the first distance, selected to provide for each second beam port a different second beam pattern essentially consisting of multiple lobes;
- wherein the first beam patterns of the first antenna array are combined with second beam patterns of the second antenna array to provide a combined beam pattern.

16. Method as claimed in claim 15, wherein for each of the lobes of a second beam pattern of the second antenna array, each single main lobe of the different beam patterns of the first antenna array essentially does not overlap with more than one lobe of the second beam pattern of the second antenna array.

17. Method as claimed in claim 15, wherein in the combined beam pattern, for each second beam port, each lobe of the multiple lobes of the second beam pattern is overlapped by the single main lobe of a different first beam pattern of the first antenna array.

18. Method as claimed in claim 17, wherein in the combined beam pattern, for each second beam port, each lobe of the multiple lobes of the second beam pattern is overlapped by the single main lobe of a different first beam pattern of the first antenna array while the non-overlapped lobes of the multiple lobes are suppressed.

19. Method as claimed in claim 15, comprising selecting a cross-channel by selecting a first beam port of the first beamforming network and selecting a second beam port of the second beamforming network, further comprising combining the first beam pattern of the selected first beam port and the second beam pattern of the selected second beam port.

20. Method as claimed in claim 19, comprising repeating the selection of a cross-channels for each combination of first beam ports and second beam ports, comprising selecting a total number (t) of orthogonal cross channels equal to first number multiplied by the second number.

21. Method as claimed in claim 15, wherein the first antenna elements of the first antenna array transmit beam radar signals and the second antenna elements of the second antenna array receives radar signals.

22. Method as claimed in claim 15, wherein the second antenna elements of the second antenna array transmit beam radar signals and the first antenna elements of the first antenna array receives radar signals.

23. Method as claimed in claim 15, wherein the plurality of single main lobes of the first antenna array are arranged contiguously.

* * * * *